(12) United States Patent
Lindström

(10) Patent No.: US 11,270,849 B2
(45) Date of Patent: Mar. 8, 2022

(54) SOLAR CELL AND A METHOD FOR MANUFACTURING THE SOLAR CELL

(71) Applicant: Exeger Operations AB, Stockholm (SE)

(72) Inventor: Henrik Lindström, Åkersberga (SE)

(73) Assignee: EXEGER OPERATIONS AB, Stockholm (SE)

(*) Notice: Subject to any disclaimer, the term of this patent is extended or adjusted under 35 U.S.C. 154(b) by 0 days.

(21) Appl. No.: 16/765,063

(22) PCT Filed: Nov. 30, 2018

(86) PCT No.: PCT/EP2018/083199
§ 371 (c)(1),
(2) Date: May 18, 2020

(87) PCT Pub. No.: WO2019/120946
PCT Pub. Date: Jun. 27, 2019

(65) Prior Publication Data
US 2020/0402726 A1    Dec. 24, 2020

(30) Foreign Application Priority Data

Dec. 21, 2017 (EP) .................................. 17209762

(51) Int. Cl.
*H01G 9/20* (2006.01)
(52) U.S. Cl.
CPC ................. *H01G 9/2059* (2013.01)
(58) Field of Classification Search
None
See application file for complete search history.

(56) References Cited

U.S. PATENT DOCUMENTS

| 9,251,963 B2 | 2/2016 | Lindstrom |
| 2005/0126629 A1* | 6/2005 | Okada ................. H01M 14/005 136/263 |

(Continued)

FOREIGN PATENT DOCUMENTS

| CN | 105247636 A | 1/2016 |
| CN | 105493305 A | 4/2016 |

(Continued)

OTHER PUBLICATIONS

Yoshida, Yoshikazu et al., "Transparent conductive oxide layer-less dye-sensitized solar cells consisting of floating electrode with gradient TiOx blocking layer", Applied Physics Letters vol. 94, No. 9, Mar. 3, 2009, pp. 93301-93301.

(Continued)

*Primary Examiner* — Dustin Q Dam
(74) *Attorney, Agent, or Firm* — Tucker Ellis LLP

(57) ABSTRACT

The present invention relates to a solar cell and a method of producing the same. The solar cell comprises a porous light absorbing layer (1), a first porous conducting layer (2), a second conducting layer (3), a porous substrate (4) between the conducting layers, the porous substrate comprises a catalytic conducting portion (4a) in electrical contact with the second conducting layer and an insulating portion (4b) between the first porous conducting layer (2) and the conducting portion, and a conducting medium (5) for transporting charges between the conducting portion (4a) and the light absorbing layer (1). The conducting medium is located in the light absorbing layer (1), the first porous conducting layer (2), and partly the porous substrate (4) so that the insulating portion (4b) and a first part (4a') of the conducting portion (4a) comprises the conducting medium and a second part (4a") of the conducting portion is free of conducting medium.

14 Claims, 4 Drawing Sheets

(56) References Cited

U.S. PATENT DOCUMENTS

| | | | | |
|---|---|---|---|---|
| 2010/0269892 A1* | 10/2010 | Yoneya | ................ | H01G 9/2031 |
| | | | | 136/252 |
| 2011/0240116 A1 | 10/2011 | Morooka | | |
| 2016/0126019 A1* | 5/2016 | Lindstrom | .......... | H01L 51/0032 |
| | | | | 136/263 |

FOREIGN PATENT DOCUMENTS

| | | |
|---|---|---|
| EP | 2224534 A1 | 9/2010 |
| EP | 2533352 A1 | 12/2012 |
| WO | 2013149787 A1 | 10/2013 |
| WO | 2013149789 A1 | 10/2013 |
| WO | 2014184379 A1 | 11/2014 |
| WO | 2017050016 A1 | 3/2017 |

OTHER PUBLICATIONS

International Search Report and Written Opinion from corresponding International Application No. PCT/EP2018/083199, dated Feb. 22, 2019, 13 pages.

Extended European Search Report for corresponding European Application No. 17209762.8, dated Nov. 9, 2018, 5 pages.

* cited by examiner

SOLAR CELL AND A METHOD FOR MANUFACTURING THE SOLAR CELL

TECHNICAL FIELD

The present invention relates to a solar cell. The present invention also relates to a method for manufacturing solar cells.

BACKGROUND

Dye-sensitized solar cells (DSC) are well known in the art, and work on similar principles as photosynthesis. Unlike silicon solar cells, these cells obtain energy from sunlight using dyes, which can be manufactured cheap and environmentally friendly.

A dye-sensitized solar cell has a light absorbing layer comprising a porous metal oxide, for example a few µm thick porous $TiO_2$ electrode layer, dyed by adsorbing dye molecules and forming a working electrode. Sunlight is harvested by the dye, producing photo-excited electrons that are injected into the conduction band of the metal oxide particles. Other words for dye in this context are chromophore, sensitizer and photosensitizer.

There exists different types of dye-sensitized solar cells, such as sandwich dye-sensitized solar cells and monolithic solar cells. A sandwich type dye-sensitized solar cell is normally manufactured by combining two separately produced parts of a cell by laying one part of the cell over the other part. A sandwich type solar cell can comprise a $TiO_2$ electrode layer deposited onto a first transparent conducting substrate. The first transparent conducting substrate normally comprises a transparent conducting oxide layer deposited onto a glass substrate. The transparent conducting oxide layer serves the function as an electron collector extracting photo-generated electrons from the working electrode. The sandwich type dye-sensitized solar cell also has a counter electrode including a second transparent conducting substrate attached to the first transparent conducting substrate. The $TiO_2$ electrode layer is in contact with an electrolyte and the second transparent conducting substrate.

Dye-sensitized solar cells of a monolithic type is, for example, known from WO 2013/149787, WO 2013/149789, and WO 2014/184379.

FIG. 1a shows an example of a prior art monolithic dye-sensitized solar cell, known from for example U.S. Pat. No. 9,251,963, comprising a working electrode including a light absorbing layer 1, a first porous conducting layer 2 for extracting photo-generated electrons from the light absorbing layer, a porous insulation substrate 4, and a counter electrode including a second conducting layer 3 arranged on the opposite side of the porous insulation substrate 4. The light absorbing layer 1 may include a porous metal oxide with dye deposited on metal oxide particles. The porous insulation substrate 4 is, for example, made of a glass fibres. The first porous conducting layer 2 is a layer of a porous conductive material deposited on one side of the porous insulation substrate 4. The second conducting layer 3 is a layer of a porous conductive material deposited on the other side of the porous insulation substrate 4. The first and second conducting layers are, for example, printed on the porous insulation substrate. In order to print the conducting layers onto the porous substrate and to handle the porous substrate with the printed layers during production, the porous substrate must have a certain mechanical stability. The mechanical stability is normally achieved by controlling the thickness of the substrate. The porous insulation substrate is electrically insulating. Both conducting layers 2, 3 comprises particles that are large enough to not penetrate the pores of the porous substrate. The porous insulation substrate 4 serves the function of separating the conducting layers physically and electrically in order to avoid direct electrical short circuit between the conducting layers 2, 3. Further, to allow the first and second conducting layers 2, 3 to be printed on the porous substrate, the porous substrate should be suitable for printing.

The solar cell in FIG. 1a is infiltrated with an electrically conducting medium 5 in the pores of the light absorbing layer, in the pores of the first and second conducting layers, and in the pores of the porous substrate. The conducting medium forms a continuous layer inside the pores of the conducting layers, and between the conducting layers inside the pores of the porous insulation substrate thereby enabling transport of electrical charge between the counter electrode and the working electrode including the light absorbing layer 1. The first porous conducting layer extracts the electrons from the light absorbing layer and transports the electrons to an external electrical circuit connected to the counter electrode (not shown in FIG. 1). The counter electrode is used to transfer the electrons to the conducting medium. The conducting medium transfer electrons back to the light absorbing layer thereby completing the electrical circuit.

Depending on the nature of the conducting medium, either ions or electrons and holes can be transported between the counter electrode and the working electrode.

Electrolytes in dye-sensitized solar cells are normally classified as liquid electrolytes, quasi-solid-state electrolytes or solid-state electrolytes. The electrolytes can be in the form of a liquid, gel or in solid state. There are a large number of electrolytes of either type known in literature, see for example Chemicals Reviews, Jan. 28, 2015, "Electrolytes in Dye-Sensitized Solar Cells". The electrolytes are an expensive component of the Dye-Sensitized Solar Cells. The counter electrode is normally equipped with a catalytic substance 3' that serves the purpose of facilitating the transfer of electrons to the electrolyte.

The conducting medium exhibits a certain electrical resistance to transport charges. The electrical resistance increases with the charge transport distance. Therefore, when electrical charge is transported between the counter electrode and the light absorbing layer, there will always be a certain electrical resistive loss in the conducting medium. By making the porous substrate thinner, the resistive losses can be reduced. However, when the porous substrate becomes thinner it also becomes more mechanically fragile.

FIG. 1b shows another prior art example of a dye sensitized solar cell, as described in WO2014/184379. This solar cell differs from the solar cell shown in FIG. 1a in that conducting particles forming a conducting network 6 through the insulating material has been inserted in the porous insulating substrate 4. The particles form one or more electrically conducting paths through the insulating material of the insulating substrate 4. Due to the conducting network 6 in the insulating substrate 4, the distance between the counter electrode and the light absorbing layer 1 does no longer depend on the thickness of the porous substrate 4. Thus, the thickness of the insulating part can be reduced, and by that the distance between the counter electrode and the light absorbing layer can be reduced. Accordingly, the resistive losses in the conducting medium is reduced. Due to the fact that the distance between the counter electrode and the light absorbing layer does no longer depend on the thickness of the whole porous substrate but only on the insulating part, it is also possible to use a substrate that is thick enough for safe mechanical handling.

Certain conducting media, like copper and cobalt complex electrolytes, can have very low electrical conductivity resulting in very large electrical resistive losses. The low electrical conductivity originates from the fact that the electrolytes have large ions with low diffusion rate. When a liquid electrolyte is to transport charges, the transporting particles move with Brownian motion; i.e. they move randomly due to collisions with fast-moving atoms or molecules in the liquid. Copper and cobalt have relatively large ions that are slow moving and thus have low conductivity. The efficiency of using such electrolytes is greatly improved by the above solution.

Another type of solar cell based on disposing a light absorbing layer on top of a porous conducting layer, a porous insulating layer and a counter electrode is described in the co-pending application WO/SE2017/050016. The light absorbing layer comprises grains of for example doped Si. A polymer charge conductor covers the grains of the light absorbing layer and extends through the conducting layer and insulating layer to the counter electrode.

A disadvantage that comes with printing a conducting layer onto a porous substrate is that the substrate has to have a thickness that supports the process. Further handling of the printed structure during the manufacturing, like conveying or turning sheets or rolls or heat treating or stapling the sheets or rolls require the structure to have a certain mechanical stability. This is achieved by having a certain thickness of the porous substrate.

In order to complete the building of the solar cell, a conducting medium is disposed into the light absorbing layer, the conducting layer and the porous layer down to the counter electrode. The conducting medium is an expensive part of the solar cell.

SUMMARY

An aspect of the present disclosure is to provide a solution, which seeks to mitigate, alleviate, or eliminate one or more of the above and below identified deficiencies in the art and disadvantages singly or in any combination. The present disclosure proposes a device and a method for minimizing the use of conducting medium in a solar cell.

More specifically, the disclosure provides for a device and a method for minimizing the use of conducting medium in solar cells by using an overlapping region of conducting medium and conducting and catalytic particles in the substrate without filling the whole substrate and counter electrode with conducting medium.

This aspect is achieved by the device and the method as defined in the independent claims.

According to some aspects of the disclosure, a solar cell is provided. The solar cell comprises a working electrode including a porous light absorbing layer, a first porous conducting layer for extracting photo-generated electrons from the light absorbing layer, wherein the light absorbing layer is arranged on top of the first porous conducting layer, a counter electrode including a second conducting layer, a porous substrate disposed between the first and second conducting layers, wherein the porous substrate comprises a conducting portion in electrical contact with the second conducting layer and an insulating portion disposed between the first porous conducting layer and the conducting portion, and a conducting medium for transporting charges between the conducting portion and the light absorbing layer. The conducting medium is located in the light absorbing layer, in the first porous conducting layer, and partly in the porous substrate so that the insulating portion of the porous substrate comprises the conducting medium and a first part of the conducting portion that abuts against the insulating portion comprises the conducting medium and a second part of the conducting portion that abuts against the second conducting layer is free of conducting medium. In other words, the porous substrate is partially filled with conducting medium such that there are three regions in the porous substrate; one insulating portion with conducting medium, one conducting portion with conducting medium and one conducting portion without conducting medium. In this way, the use of conducting medium can be minimized. This saves a lot of cost, especially in big scale production, and can also enable the use of more expensive conducting mediums for better efficiency without significantly increasing the costs. Also, for the use of liquid conducting mediums, the risk of leakage can be lowered when smaller amounts of the liquid is used.

Due to the conducting portion in the porous substrate, the insulated distance between the counter electrode, i.e. the second conducting layer, and the light absorbing layer does not depend on the total thickness of the porous substrate. In other words, even when using a thick porous substrate, the thickness of the insulating portion 4b can be reduced, and by that, the distance between the counter electrode 3 and the light absorbing layer 1 can be reduced. Accordingly, the resistive losses in the conducting medium is reduced. Due to the fact that the effective distance for transferring charges between the counter electrode and the light absorbing layer does not depend on the thickness of the porous substrate, it is also possible to use a substrate that is thick enough for safe mechanical handling. By also limiting the presence of the conducting medium to the insulating portion and to the first part of the conducting medium, the amount of used conducting medium is minimized. This makes it possible to have a substrate thick enough for safe mechanical handling and lower the cost of materials since the whole substrate does not need to be filled with conducting medium.

According to some aspects, the conducting medium is located in pores of the light absorbing layer, in pores of the first porous conducting layer, in pores of the insulating portion of the porous substrate and in pores of the first part of the conducting portion. When the conducting medium is located in the pores of a porous material it is possible for the conducting medium to form a continuous chain, such that the conducting medium can efficiently transport charges between the conducting portion and the light absorbing layer.

The conducting medium is, for example, a conventional $I^-/I^-_3$ electrolyte or a similar electrolyte, or a $Cu^-/Co^-$ complex electrolyte. Solid state transition metal based complexes or organic polymer hole conductors are known conducting mediums.

According to some aspects, the conducting portion comprises catalytic elements. The catalytic elements assist in the transfer of charges between the conducting portion and the conducting medium.

According to some aspects, the porous substrate comprises a porous insulating material and the conducting portion comprises conducting and catalytic particles accommodated in the pores and forming a conducting network through the insulating material and wherein the conducting medium is in electrical and catalytic contact with the conducting network in the first part of the conducting portion. Thus, in the part of the porous substrate where the conducting medium and the conducting and catalytic particles overlap, in the first part, they are both present in the pores of the porous substrate. This will give good electrical contact between the two.

According to some aspects, the distance between the light absorbing layer and the first part is between 0.2 µm and 60 µm, and preferable between 0.8 and 50 µm. In other words, the conducting medium will transfer charges the maximum distance of 60 µm or preferably 50 µm.

According to some aspects, the thickness of the conducting portion is less than 1 mm, and preferably less than 100 µm. Due to the fact that the conducting portion is thin, the demand on the conductivity of the conducting portion is rather low, and lower than the demand on the conductivity of the first and second conducting layers.

According to some aspects, the thickness of the insulating portion is between 0.1 µm and 40 µm, and preferably between 0.5 µm and 20 µm. Thus, the electrical resistive losses in the conducting medium are reduced and still short circuit is avoided between the first and third conducting layer.

According to some aspects, the thickness of the first porous conducting layer is between 0.1 µm and 40 µm, and preferably between 0.3 and 20 µm. The thickness of the first porous conducting layer is advantageously kept thin in order to have a short distance between the light absorbing layer and the third conducting layer and the counter electrode.

According to some aspects, the thickness of the first part of the conducting portion, is smaller than the thickness of the second part of the conducting portion. In other words, the overlapping part, which is both conducting and comprises conducting medium, is smaller than the part which does not comprise conducting medium according to some aspects. The overlapping region only needs to be thick enough to allow for electrical contact between the conducting portion and the conducting medium. The thinner the overlapping part, i.e. the first part, is, the less conducting medium can be used. It should be noted that, the limit of where the conducting medium is located in the porous substrate, that is, the line between the first and the second part of the conducting portion, is not necessarily a straight line.

According to some aspects, the thickness of the porous substrate is between 10 µm and 1 mm. Such a layer provides good mechanical strength to the solar cell.

According to some aspects, the insulating portion (4b) is an integral part of the porous substrate (4).

According to some aspects, the conducting medium comprises copper ions. Copper ions, i.e. $Cu^{2+}$, $Cu^+$, is a non-toxic conducting medium. The use of copper as conducting medium has been shown to give a very high resulting photo voltage.

According to some aspects, the average pore size of the porous substrate is larger than the average pore size of the first porous conducting layer, and wherein the average pore size of the first conducing layer is larger than the average pore size of the light absorbing layer. This is advantageous in the production of the solar cell. When using pores that are smaller on top and then larger and larger further down the solar cell, capillary action can be utilized. When dispensing conducting medium in a liquid or gel form on top of the light absorbing layer, the conducting medium does not flow down to the bottom of the solar cell but is kept in the top layer by the capillary action until the top layer is filled. This is more thoroughly explained in the detailed description when discussing the method for producing the solar cell.

According to some aspects, examples of conducting and catalytic particles comprises one or more of: PEDOT, carbon, platinum, titanium, titanium alloys, nickel, nickel alloys, carbon based materials, conducting oxides, conducting nitrides, conducting carbides and conducting silicides, platinized FTO, ATO, ITO, carbon black, graphene, or carbon nanotubes. The conducting and catalytic particles comprise for example a conducting core with a catalytic shell or coating. Another option is to use particles having a low activation energy and that are both conducting and catalytic such as carbon nanotubes, metal carbides, metal nitrides and metal silicides.

According to some aspects, the solar cell is a dye-sensitized solar cell. The light absorbing element is then a dye as explained in the background. Conventional dyes known in the art can be used. A dye is chosen to give good efficiency of the solar cell, especially in combination with a copper based conducting medium. The dye can for example be triarylamine organic dye comprising any of, or a mixture of, dye in the class Donor-π bridge-Acceptor (D-π-A) and in the class Donor-Acceptor-π bridge-Acceptor (D-A-π-A).

Other types of light absorbing elements like doped Si grains, or grains of CdTe, CIGS, CIS, GaAs, perovskite can also be applicable.

The limited amount of conducting medium in the solar cell needed by using the above design can make a saving of conducting medium of up to 75%.

According to some aspects of the disclosure, a method for manufacturing a solar cell is provided. The solar cell comprises a first porous conducting layer and a second conducting layer and a porous substrate disposed between the first and second conducting layers. The method comprises preparing the porous substrate such that the porous substrate comprises a conducting portion at a first side of the porous substrate and an insulating portion at a second side of the porous substrate, depositing a porous conducting layer on the second side of the porous substrate to form the first porous conducting layer, depositing the second conducting layer such that the conducting portion is in electrical contact with the second conducting layer, depositing a porous semiconducting layer on top of the first porous conducting layer to form the light absorbing layer and depositing a conducting medium onto the light absorbing layer, and depositing the conducting medium until the conducting medium has entered the light absorbing layer, the first porous conducting layer and partly the porous substrate so that the insulating portion of the porous substrate comprises the conducting medium and a first part of the conducting portion that abuts against the insulating portion comprises the conducting medium and a second part of the conducting portion that abuts against the second conducting layer is free of conducting medium. The advantages of the resulting solar cell is previously discussed. The method is an effective way of depositing contacting medium such that it does not fill the whole porous substrate, or more in particular, such that it does not fill the conducting portion of the porous substrate. Another advantage with this method is that it is easy to manufacture the solar cell according to the disclosure.

According to some aspects, preparing the porous substrate comprises depositing a blocking agent on a second side of the porous substrate, the porous substrate comprising an insulating material, to form a blocking layer in a portion of the substrate and infiltrating the porous substrate from a first side of the substrate with conducting and catalytic particles having a size smaller than the pore size of the substrate to form a conducting portion. This is an efficient method to produce the porous substrate such that is comprises an insulating portion and a conducting portion.

According to some aspects, preparing the porous substrate comprises, after depositing the first porous conducting layer and the second conducting layer, heat treating the substrate to burn off the blocking layer thus forming the insulating portion. Depending on the blocking agent used, it may be kept in the insulating portion or burned off after depositing the first and second conducting layers. Some blocking agents may not disturb the function of the solar cell and then they can be left in the substrate.

According to some aspects, depositing the second conducting layer comprises depositing an ink comprising conductive particles on the first side of the porous substrate. In other words, the second conducting layer is printed on the first side.

According to some aspects, depositing the second conducting layer comprises depositing a metal layer on the first side of the porous substrate. Thus, the second conducting layer is deposited as a sandwich construction.

According to some aspects, the conducting medium is comprised in a liquid or gel. When the conducting medium is comprised in a liquid or gel it may simplify deposition of the contacting medium to the light absorbing layer, the first conducting medium, the insulating portion and the first part of the conducting portion.

According to some aspects, the light absorbing layer, the porous substrate and the first porous conducting layer are prepared such that the first porous conducting layer has a pore size that is smaller than the pore size of the porous substrate and such that the light absorbing layer has a pore size that is smaller than the pore size of the first porous conducting layer and wherein the capillary action will prevent the liquid or gel from flowing to the first porous conducting layer until the light absorbing layer is saturated and to the porous substrate until the first porous conducting layer is saturated and prevent the liquid or gel from flowing to the conducting portion until the insulating portion is saturated and prevent the liquid or gel from flowing to the second part of the conducting portion. This method for depositing the conducting medium uses capillary action to prevent the contacting medium from running too deep in the porous substrate to save the amount of conducting medium used.

According to some aspects, the conducting medium is prevented from entering the second part of the conducting portion by polymerizing the liquid or gel before it reaches the second part. Polymerizing the liquid or gel is an efficient way of controlling where, in the solar cell, the conducting medium is deposited.

According to some aspects, the polymerization is initiated using any one of, or a combination of: UV-light illumination, heating and a two-component process. The choice of which one to use depends on the choice of liquid or gel.

BRIEF DESCRIPTION OF THE DRAWINGS

The present technique will be more readily understood through the study of the following detailed description of the aspects together with the accompanying drawings, of which.

Figure 1A:
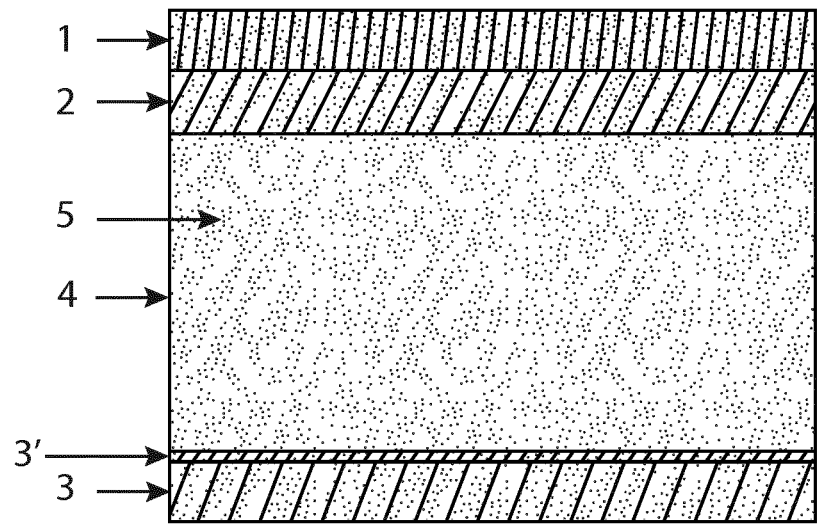
FIG. 1a shows an example of a prior art dye sensitized solar cell as described in the background.
Figure 1B:
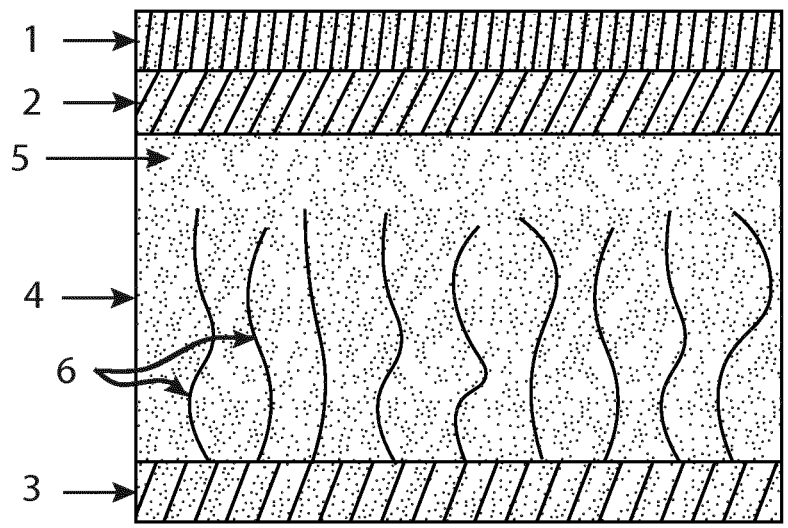
FIG. 1b shows another example of a prior art dye sensitized solar cell as described in the background.

The figures are not to scale, emphasis instead being placed on illustrating the example aspects.

DETAILED DESCRIPTION

Aspects of the present disclosure will be described more fully hereinafter with reference to the accompanying drawings. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
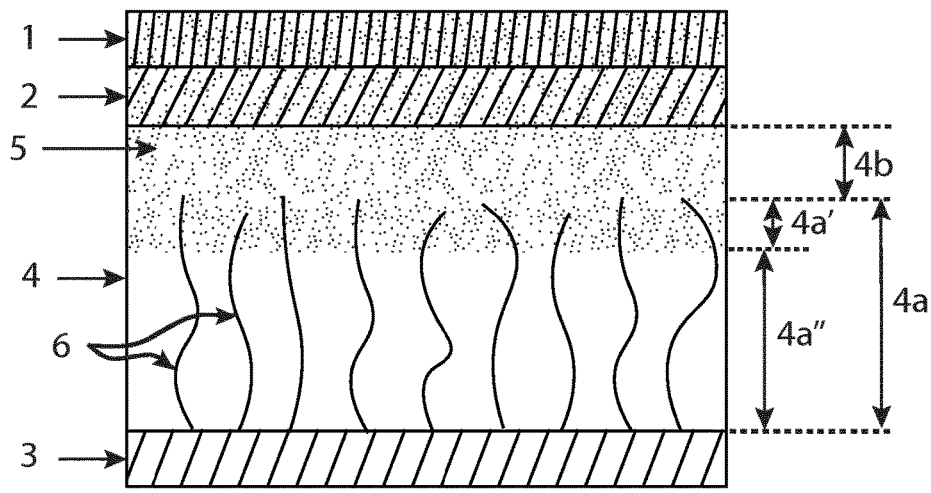
FIG. 2 illustrates an example of a dye sensitized solar cell.

FIG. 2 shows an example of a dye-sensitized solar cell according to some aspects of the disclosure. The solar cell is preferably a monolithic dye-sensitized solar cell. A monolithic dye-sensitized solar cell is characterized in that all layers are directly or indirectly deposited on one and the same porous substrate.

The solar cell comprises a working electrode including a porous light absorbing layer 1 and a first porous conducting layer 2 for extracting photo-generated electrons from the light absorbing layer. The light absorbing layer 1 and the first porous conducting layer 2 are porous layers. The light absorbing layer 1 of the working electrode may include a porous TiO2 electrode layer deposited onto the first porous conducting layer 2. The TiO2 electrode layer may comprise TiO2 particles dyed by adsorbing dye molecules on the surface of the TiO2 particles. According to some aspects, the solar cell is a dye-sensitized solar cell. The light absorbing element is then a dye as explained in the background. Conventional dyes known in the art can be used. A dye is chosen to give good efficiency of the solar cell, especially in combination with a copper based conducting medium. The light absorbing layer may also comprise silicon, Si, grains or grains of CdTe, CIGS, CIS, GaAs, perovskite can also be applicable. The first porous conducting layer 2 comprises conducting particles and has, according to some aspects, a surface layer of TiO2.

The light absorbing layer 1 is arranged on top of the first porous conducting layer 2. The solar cell also comprises a counter electrode including a second conducting layer 3 and a porous substrate 4 disposed between the first and second conducting layers 2, 3. The porous substrate 4 comprises a conducting portion 4a in electrical contact with the second conducting layer 3. An insulating portion 4b is disposed between the first porous conducting layer 2 and the conducting portion 4a. The insulating portion 4b of the porous substrate prevents short circuit between the first and second conducting layers because it is electrically insulating. In other words, the insulating portion 4b of the porous substrate 4 serves the function of separating the conducting layers 2, 3 physically and electrically in order to avoid direct electronic short circuit between the conducting layers 2, 3. The conducting portion 4a forms an extension of the second conducting layer 3. The first and second conducting layers 2, 3 are, for example, printed on the porous substrate. To allow the first and second conducting layers 2, 3 to be printed on the porous substrate, the porous substrate should be suitable for printing. Both conducting layers 2, 3 consist of particles that are large enough to not penetrate the pores of the porous substrate. The material forming the conducting layers 2, 3 must have a suitable corrosion resistance as to withstand the environment in the solar cell, and preferably also be resistant to temperatures above 500° C. in air without losing adequate conductivity. Preferably, the conducting layers 2, 3 are made of a material selected from a group consisting of titanium, titanium alloys, nickel, nickel alloys, graphite, and amorphous carbon, or mixtures thereof.

It should be noted that the first and second conducting layers 2, 3 are positioned on a shadow side of the light absorbing layer 1, i.e. the side opposite the side receiving the light. Thus, the first and second conducting layers are positioned on the same side of the light absorbing layer as shown in the figures.

Figure 3:
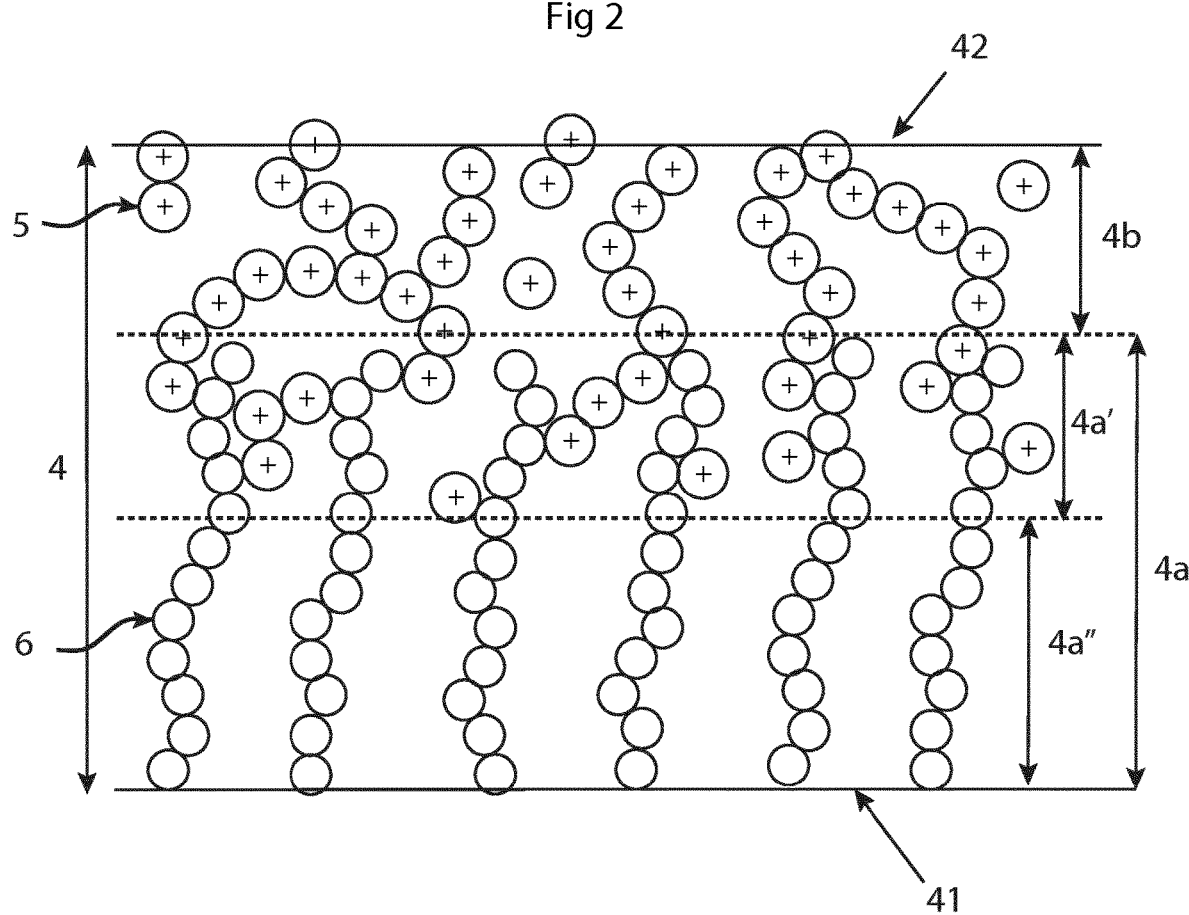
FIG. 3 is an illustration of a porous substrate with a conducting portion, an insulating portion and overlap of conductive particles in a first part of the conducting portion.

The solar cell also comprises a conducting medium 5 for transporting charges between the conducting portion 4a and the light absorbing layer 1. The conducting medium is located in the light absorbing layer 1, in the first porous conducting layer 2, and partly in the porous substrate 4 so that the insulating portion 4b of the porous substrate comprises the conducting medium and a first part 4a' of the conducting portion 4a that abuts against the insulating portion comprises the conducting medium and a second part 4a" of the conducting portion that abuts against the second conducting layer is free of conducting medium. In other words, the porous substrate is partially filled with conducting medium such that there are three regions in the porous substrate; one insulating portion with conducting medium, one conducting portion with conducting medium and one conducting portion without conducting medium. In this way, the use of conducting medium can be minimized. FIG. 3 is an illustration of the porous substrate 4, with the three regions 4a', 4a" and 4b. The conducting medium 5 is in electrical contact with the conducting portion 4a, in the figure illustrated as conducting particles in a network, such that it can transfer charges from the second conducting layer 3, via the conducting portion 4a of the porous substrate 4, to the light absorbing layer 1. This is cost saving, especially in big scale production, and can also enable the use of more expensive conducting mediums for better efficiency without significantly increasing the costs. Also, for the use of liquid conducting mediums, the risk of leakage can be lowered when smaller amounts of the liquid is used. It should be noted that "free of conducting medium" means that there is little enough conducting medium such that the conducting medium in itself cannot transfer charges. Preferably, the second part 4a" does not contain any conducting medium, but in the manufacturing process, it will be very difficult to prevent some conducting medium from entering the second part. It should be further noted that the second conducting layer is inherently also free of conducting medium since it is located below the second part 4a".

Due to the conducting portion 4a in the porous substrate 4, the insulated distance between the counter electrode, i.e. the second conducting layer 3, and the light absorbing layer 1 does not depend on the total thickness of the porous substrate 4. In other words, even when using a thick porous substrate, the thickness of the insulating portion 4b can be reduced, and by that, the distance between the counter electrode 3 and the light absorbing layer 1 can be reduced. Accordingly, the resistive losses in the conducting medium 5 is reduced. Due to the fact that the distance for the charges to travel between the second conducting layer 3 and the light absorbing layer 1 does not depend on the thickness of the porous substrate 4, it is possible to use a substrate that is thick enough for safe mechanical handling. By also limiting the presence of the conducting medium to the insulating portion 4b and to the first part 4a' of the conducting portion 4a, the amount of used conducting medium 5 is minimized. The limited amount of conducting medium in the solar cell needed by using the above design can make a saving of conducting medium of up to 75%. This makes it even more possible to have a substrate thick enough for safe mechanical handling since the whole substrate does not need to be filled with conducting medium which can be expensive. Furthermore, the effectiveness of the solar cell will not be as sensitive to the choice of conducting medium. For example, copper ions, which are easily obtainable but is an expensive, large and slow ion can be used more advantageously than before. Due to the fact that the conducting medium 5 does not fill the whole porous substrate 4 but only such that it overlaps with, and is in electrical contact with, the conducting portion 4a', for example copper ions can be used advantageously. The porous substrate must allow for fast transport of ions or holes between the electrodes. In order to distribute the conducting medium, the substrate must have sufficiently high porosity (pore volume fraction) and low tortuosity.

When the conducting medium 5 is located in the pores of a porous material, the conducting medium forms a continuous chain, such that the conducting medium efficiently can transport charges between the conducting portion 4a and the light absorbing layer 1. It should be noted that the conducting medium 5 is illustrated as random dots in FIG. 2. However, it is merely an illustration of where the conducting medium is present, not how the particles are actually positioned. Thus, according to some aspects, the light absorbing layer 1 and the first porous conducting layer 2 are porous, and the conducting medium 5 is located in pores of the light absorbing layer 1, in pores of the first porous conducting layer 2, in pores of the insulating portion 4b of the porous substrate 4 and in pores of the first part 4a' of the conducting portion 4a. Important features of the finished solar cell product are that the distance to travel for the charges between the second conducting layer 3 and the light absorbing layer 1 is short and that the product is mechanically strong enough for handling.

The first porous conducting layer 2 and the porous substrate 4 are porous to allow the conducting medium to penetrate through the conducting layers when the conducting medium is applied after the layers have been formed. The conducting medium 5 is for example a solid-state hole conductor, or an ionic liquid based electrolyte or a cobalt complex based electrolyte. However, the conducting medium can be any suitable conducting medium. The conducting medium can be a liquid, a gel, or a solid material such as a semiconductor. Examples of electrolytes are liquid electrolytes (such as those based on the I−/I3−, redox couple or cobalt complexes as redox couple), gel electrolytes, dry polymer electrolytes and solid ceramic electrolytes. Examples of semiconductors are inorganic semiconductors, such as CuSCN or CuI, and organic semiconductors, such as, e.g., Spiro-OMeTAD.

The conducting medium 5 needs to penetrate through the first porous conducting layer 2 to be able to deliver the electrons to the light absorbing layer. Thus, the first porous conducting layer needs to have sufficiently high porosity (pore volume fraction) and/or low tortuosity. This can be achieved with canals through the layer, with big grains in the layer, with monodisperse particles and/or pore forming agents.

Figure 4:
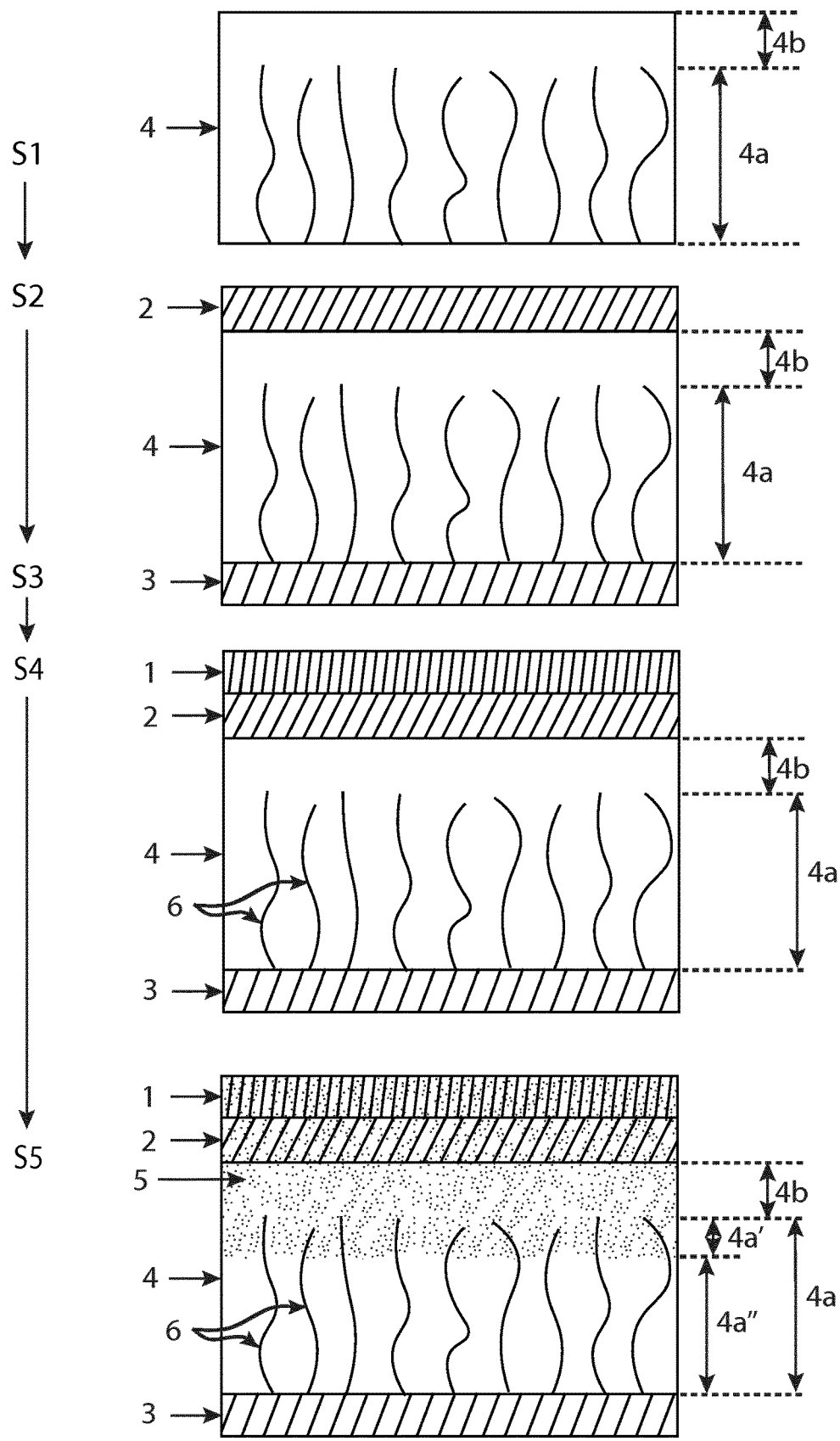
FIG. 4 shows an example of production of the porous substrate and first and second conducting layers according to some aspects of the disclosure.

FIG. 4 is an illustration of a method for manufacturing the solar cell. As described above, the solar cell comprises the first porous conducting layer 2 and the second conducting layer 3 and the porous substrate 4 disposed between the first and second conducting layers. The method comprises preparing S1 the porous substrate 4 such that the porous substrate comprises the conducting portion 4a at a first side 41 of the porous substrate and the insulating portion 4b at a second side 42 of the porous substrate, as shown in the figure as S1. A porous conducting layer is deposited S2 on the second side 42 of the porous substrate to form the first porous conducting layer 2. The second conducting layer 3 is deposited S3 such that the conducting portion 4a is in electrical contact with the second conducting layer and a porous semiconducting layer is deposited S4 on top of the first porous conducting layer 2 to form the light absorbing layer 1. Details of example ways to deposit the layers will be described further down. This structure has several advantages such as ease of large-scale manufacturing and providing a well-defined and constant distance between the second conducting layer and the light absorbing layer, when deposited on top of the first porous conducting layer.

The first side 41 is the bottom side and the second side 42 is the top side of the porous substrate 4 as shown in FIG. 3. As shown in FIG. 3, the conducting portion 4a is located in the lower part of the porous substrate 4 and the insulating portion 4b is located in the upper part of the porous substrate 4. Thus, the porous substrate 4 comprises two parts, the conducting portion 4a and the insulating portion 4b; the conducting portion 4a is at the first side 41 of the porous substrate 4 and the insulating portion 4b is at the second side 42 of the porous substrate 4. In other words, the conducting portion 4a is located at a side of the porous substrate 4 associated with the first side 41 and the insulating portion 4b is located at a side of the porous substrate 4 associated with the second side 42.

The porous substrate 4 is, for example, made of microfibers. A microfiber is a fibre having a diameter less than 10 μm and length larger than 1 nm. Suitably, the porous substrate comprises woven microfibers. Ceramic microfibers are fibres made of a refractory and inert material, $SiO_2$, $Al_2O_3$ and aluminosilicate. The microfibers may also be glass microfibers. Organic microfibers are fibres made of organic materials such as polymers such as, e.g., polycaprolactone, PET, PEO etc, or cellulose such as, e.g., nanocellulose (MFC) or wood pulp.

The porous substrate 4 may comprise woven microfibers and non-woven microfibers disposed on the woven microfibers.

The conducting medium 5 is deposited S4 onto the light absorbing layer 1, and the conducting medium is deposited until the conducting medium has entered the light absorbing layer 1, the first porous conducting layer 2 and partly the porous substrate 4 so that the insulating portion 4b of the porous substrate comprises the conducting medium and a first part 4a' of the conducting portion that abuts against the insulating portion 4b comprises the conducting medium and a second part 4a" of the conducting portion that abuts against the second conducting layer is free of conducting medium. The advantages of the resulting solar cell is previously discussed. The method is an effective way of depositing conducting medium 5 such that it does not fill the whole porous substrate 4, or more in particular, such that it does not fill the whole conducting portion 4a of the porous substrate. In other words, the conducting portion 4a is partially filled with conducting medium 5 such that the conducting medium is in electrical contact with the conducting portion. Another advantage with this method is that it is easy to manufacture the solar cell according to the disclosure. It should be noted that if the depositing of the conducting medium is continued after reaching the first part, it will continue to flow to the second part. The amount of deposited conducting media will therefore be important.

The conducting medium is for example a conventional $I^-/I^-_3$ electrolyte or a similar electrolyte, or a Cu or Co complex based electrolyte. Solid state transition metal based complexes or organic polymer hole conductors are known conducting mediums. According to some aspects, the conducting medium is PEDOT.

As previously discussed, the first and second conducting layers 2, 3 can, for example, be deposited by printing. The first porous conducting layer 2 may alternatively be formed by evaporation or sputtering of a titanium layer onto the porous substrate, or any other method for depositing a thin layer of titanium onto the porous substrate 4. The second conducting layer 3 is for example deposited S3 by depositing S3a an ink comprising conductive particles on the first side 41 of the porous substrate 4. In other words, the second conducting layer is printed on the first side 41. Another alternative is that depositing S3 the second conducting layer 3 comprises depositing S3b a metal layer on the first side 41 of the porous substrate 4. Thus, the second conducting layer is deposited as a sandwich construction.

The light absorbing layer 1 is deposited onto the first porous conducting layer 2. The light absorbing layer is, for example, formed by depositing a porous TiO2 layer onto the first porous conducting layer and thereafter adsorb a dye onto the TiO2 layer in the case that the solar cell is a dye-sensitized solar cell. The conducting medium 5 is deposited onto the light absorbing layer 1 before depositing onto the first porous conducting layer 2 such that the conducting medium 5 first fills the light absorbing layer 1 and then continues to fill the first conducting medium 2 according to above. The solar cell comprises a light absorbing layer 1 and the depositing of the conducting medium 5 is done onto the light absorbing layer 1 and then onto the first porous conducting layer 2 from the light absorbing layer and so on. Hence, the conducting medium 5 is located in the light absorbing layer 1, in the first porous conducting layer 2, in the insulating portion 4b and in the first part 4a' of the conducting portion 4a such that the conducting medium 5 forms a continuous conducting path between the first part and the light absorbing layer.

One way of controlling how many layers the conducting medium penetrates, that is, controlling the conducting medium 5 such that it does not enter the second part 4a" of the conducting portion, is to deposit a predetermined amount of conducting medium 5 onto the first porous conducting layer 2 or the light absorbing layer 1. The pores of the light absorbing layer 1 should be as filled with conducting medium as possible to maximise the efficiency of the solar cell. According to some aspects, the conducting medium 5 is deposited until there is an adequate electrical connection between the first part 4a' and the light absorbing layer 1. In other words, the conducting medium 5 is deposited until there is an overlap between the conducting medium 5 and the conducting portion 4a of the porous substrate 4.

Capillary action (sometimes called capillarity, capillary motion, or wicking) is the ability of a liquid, or solvent, to flow in narrow spaces without the assistance of, or even in opposition to, external forces like gravity. According to some aspects, the average pore size of the porous substrate 4 is larger than the average pore size of the first porous conducting layer 2, and wherein the average pore size of the first conducing layer 2 is larger than the average pore size of the light absorbing layer 1. This is advantageous in the production of the solar cell. When using pores that are smaller on top and then larger and larger further down the solar cell, capillary action can be utilized. When dispensing conducting medium in a liquid or gel form on top of the light absorbing layer or the first porous conducting layer, depending on the method, the conducting medium does not flow down to the bottom of the solar cell but is kept in the top layer by the capillary action until the top layer is filled.

As previously discussed, FIG. 3 is an illustration of an example of the porous substrate 4, with the three regions 4a', 4a" and 4b. According to some aspects, the conducting portion comprises catalytic elements. The catalytic elements assist in the transfer of charges between the conducting portion and the conducting medium. It can be seen in the figure that the conducting portion 4a comprises a network of particles. Those particles are conducting particles and according to some aspects, the porous substrate 4 comprises a porous insulating material and the conducting portion 4a comprises conducting and catalytic particles accommodated in the pores and forming a conducting network 6 through the insulating material and wherein the conducting medium is in electrical and catalytic contact with the conducting network in the first part of the conducting portion. Thus, in the part of the porous substrate 4 where the conducting medium 5 and the conducting and catalytic particles overlap, in the first part 4a', they are both present in the pores of the porous substrate. This will give good electrical contact between the two. In the figure, the porous substrate 4 comprises a conducting portion 4a including conducting particles forming a conducting network 6 in the insulating material of the porous substrate, and an insulating portion 4b without any conducting particles and forming a porous insulating layer. The insulating portion 4b is here formed as an integral part of the porous substrate 4.

The conducting network 6 is in direct physical and electrical contact with the second conducting layer 3 of the counter electrode and will therefore significantly increase the conductive surface area of the counter electrode. The conducting surface area serves the function of transferring electrons or holes from the counter electrode to the conducting network. The conducting network in the porous substrate and the thus increased conductive surface area of the second conducting layer decrease the charge transfer resistance between the conducting medium 5 and the conducting network 6. Additionally, since the conducting portion 4a forms a conducting network extending through the insulating material of the porous substrate, the distance between the light absorbing layer 1 and the conducting portion 4a is shorter than the distance between the light absorbing layer 1 and the second conducting layer 3. The conducting particles are smaller than the average pore size of the porous layer 4 in order to be infiltrated effectively.

The conducting particles in the conducting portion 4a may consist of the same material as is used in the second conducting layer 3. It is also possible to use other types of particles such as carbon based materials (graphite, carbon black, CNT, graphene, etc). It is also possible to use other types of particles such as conducting oxides (ITO, FTO, ATO etc) or carbides, nitrides or silicides. According to some aspects, the conducting and catalytic particles comprises one or more of: PEDOT, carbon, platinum, titanium, titanium alloys, nickel, nickel alloys, carbon based materials, conducting oxides, conducting nitrides, conducting carbides, conducting silicides, platinized FTO, ATO, ITO, carbon black, graphene, and carbon nanotubes. The conducting and catalytic particles comprise for example a conducting core with a catalytic shell or coating. The conducting core can be made of metal, metal alloy, metal oxide, or other conducting materials. Another option is to use particles having a low activation energy and that are both conducting and catalytic such as carbon nanotubes, metal carbides, metal nitrides and metal silicides.

The conducting medium 5 comprises for example ions and according to some aspects, the conducting medium 5 comprises copper ions. Copper ions, i.e. $Cu^{2+}$, $Cu^+$, is a non-toxic conducting medium and has been shown to give good efficiency, especially in dye-sensitized solar cells.

The ions are free moving ions for transferring charges between the counter electrode and the light absorbing layer. Another example of ions that may be used as conducting medium is cobalt ions. The conducting medium may also be a cobalt based electrolyte, a cobalt complex based electrolyte or a copper complex based electrolyte. The conducting medium comprises according to some aspects ligands, such as phenanthrolines. The most common used ion combination used as electrolyte is the $I^-/I_3^-$.

Depending on the nature of the conducting medium, either ions or electrons and holes, can be transported between the counter electrode 3 and the working electrode 1. The conducting medium 5 may for example be a solid-state hole conductor. A solid-state hole conductor is, for example, a semiconductor. An advantage using a hole conductor is that it is a solid material and accordingly the requirement of sealing of the solar cell is reduced. Examples of semiconductors are inorganic semiconductors, such as CuSCN or CuI, and organic semiconductors, such as, e.g., P3HT or Spiro-OMeTAD. According to some aspects, the conducting medium is a solid-state hole conductor, or an ionic liquid based electrolyte, or a cobalt complex based electrolyte. Semiconducting perovskites, like $CH_3NH_3PbI_3$, $CH_3NH_3PbI_{3-x}Cl_x$ or $CH_3NH_3SnI_3$ or other suitable perovskites can be used.

The thicknesses of the layers of this disclosure will depend on many factors. Efficiency of the solar cell is obviously important, such is also the mechanical strength of the solar cell; it must be possible to handle both during production and as a finished product without breaking. But the required mechanical strength may vary depending on how and where the solar cell will be used. The efficiency may also be sacrificed in order to produce a cheaper solar cell and also depending on the intended use of the solar cell. Method of manufacturing will also influence which thicknesses are possible. Therefore, the thicknesses of the layers may vary. According to some aspects, the thickness of the first part 4a' of the conducting portion 4a is smaller than the thickness of the second part 4a" of the conducting portion. In other words, the overlapping part, which is both conducting and comprises conducting medium 5, is smaller than the part which does not comprise conducting medium. The overlapping region only needs to be thick enough to allow for electrical contact between the conducting portion and the conducting medium. The thinner the overlapping part, i.e. the first part, is, the less conducting medium 5 can be used. The thickness of the second part 4a" of the conducting portion depends on the desired mechanical strength of the packet of layers to be handled during manufacturing and the resulting solar cell.

It should be noted that, depending on the method of manufacture, the limit of where the conducting medium is located in the porous substrate, that is, the line between the first and the second part of the conducting portion, is not necessarily a straight line. It should be noted that by using the method described above, the line will most likely have an irregular shape where the conducting medium has entered the porous substrate at different depths.

As explained, some can be said about the thicknesses of the different layers but the skilled person realizes that the thicknesses will depend too much of the implementation and manufacturing process of the solar cell for providing exact measurements. According to some aspects, the distance between the light absorbing layer 1 and the first part 4a' is between 0.2 µm and 60 µm, and preferable between 0.8 and 50 µm. In other words, the conducting medium will transfer charges the maximum distance of 60 µm or preferably 50 µm. According to some aspects, the thickness of the conducting portion 4a is less than 1 mm, and preferably less than 100 µm. Due to the fact that the conducting portion is thin, the demand on the conductivity of the conducting portion is rather low, and lower than the demand on the conductivity of the first and second conducting layers. According to some aspects, the thickness of the insulating portion 4b is between 0.1 µm and 40 µm, and preferably between 0.5 µm and 20 µm. Thus, the electrical resistive losses in the conducting medium are reduced and still short circuit is avoided between the first and third conducting layer. According to some aspects, the thickness of the first porous conducting layer 2 is between 0.1 µm and 40 µm, and preferably between 0.3 and 20 µm. The thickness of the first porous conducting layer is advantageously kept thin in order to have a short distance between the light absorbing layer and the third conducting layer and the counter electrode.

According to some aspects, the thickness of the porous substrate 4 is between 10 µm and 1 mm. Such a layer provides good mechanical strength to the structure of layers during production and to the resulting solar cell.

Figure 5:
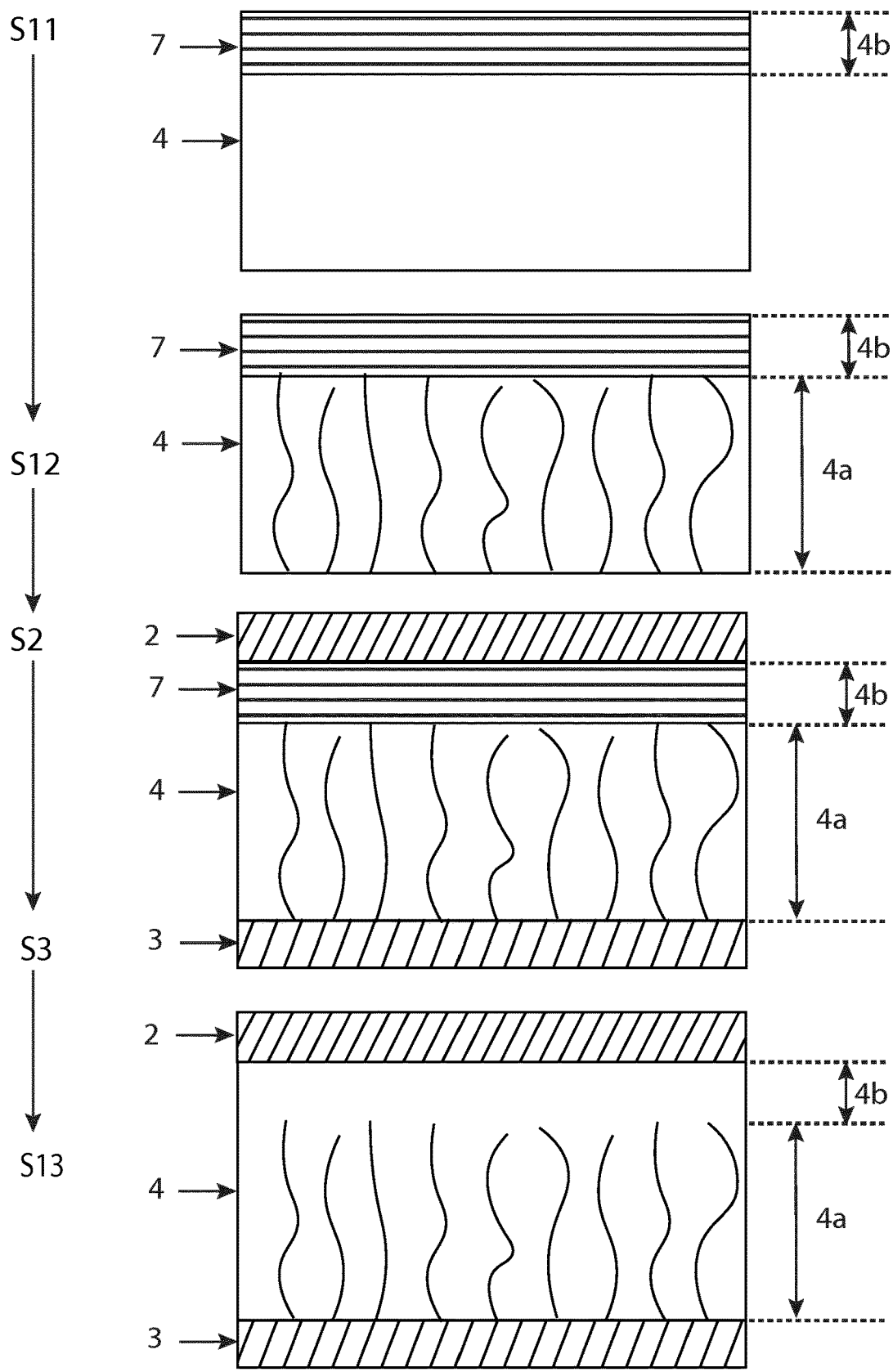
FIG. 5 shows an example of production of the porous substrate and the first and second conducting layers using a blocking layer.

One way to prepare the porous substrate is illustrated in FIG. 5. According to some aspects, preparing S1 the porous substrate 4 comprises depositing S11 a blocking agent on a second side 42 of the porous substrate 4, the porous substrate comprising an insulating material, to form a blocking layer 7 in a portion 4b of the substrate, and infiltrating S12 the porous substrate from a first side 41 of the substrate with conducting and catalytic particles having a size smaller than the pore size of the substrate to form a conducting portion 4a. This is an efficient method to produce the porous substrate such that is comprises an insulating portion 4b and a conducting portion 4a. Using this method forms the network of conducting particles 6, which has been previously discussed. The blocking agent is either a material, such as fibres, that does not affect the function of the solar cell, and can thus be left there, or it is burned off after depositing the first and second conducting layers. Therefore, according to some aspects, preparing S1 the porous substrate 4 comprises, after depositing S2, S3 the first porous conducting layer 2 and the second conducting layer 3, heat treating S13 the substrate to burn off the blocking layer thus forming the insulating portion 4b. Again, depending on the blocking agent used, it may be kept in the insulating portion or burned off after depositing the first and second conducting layers. Some blocking agents may not disturb the function of the solar cell and then they can be left in the substrate.

Some of the layers may require heat treatment for sintering them. The light absorbing layer 1 and the conducting layers 2, 3 may require sintering. The conducting layers 2, 3 may be sintered in the same heat treatment as the light absorbing layer or earlier. When the heat treatment is performed will depend on the material choices. Some conducting media may be sensitive to heat treatment and if such a media is used, the heat treatment should be performed before depositing the conducting medium.

As previously discussed, capillary action may be used in producing the solar cells. According to some aspects, the light absorbing layer 1, the porous substrate 4 and the first porous conducting layer 2 are prepared such that the first porous conducting layer 2 has a pore size that is smaller than the pore size of the porous substrate 4 and such that the light absorbing layer 1 has a pore size that is smaller than the pore size of the first porous conducting layer 2 and wherein the capillary action will prevent the liquid or gel from flowing to the first porous conducting layer until the light absorbing layer is saturated and to the porous substrate until the first porous conducting layer is saturated and prevent the liquid or gel from flowing to the conducting portion 4a until the insulating portion 4b is saturated and prevent the liquid or gel from flowing to the second part 4a" of the conducting portion This method for depositing the conducting medium 5 uses capillary action to prevent the contacting medium from running too deep in the porous substrate 4 to save the amount of conducting medium used.

There may be several ways to prevent the conducting medium 5 from entering the second part 4a" of the conducting portion 4a. One way the conducting medium may be prevented from entering the second part 4a" of the conducting portion 4a is by polymerizing the liquid or gel before it reaches the second part. Polymerizing the liquid or gel is an efficient way of controlling where, in the solar cell, the conducting medium is located. According to some aspects, the polymerization is initiated using any one of, or a combination of: UV-light illumination, heating and a two-component process. The choice of which one to use depends on the choice of liquid or gel. Another way of stopping the conducting medium from flowing into the second part 4a" is to use a liquid or gel that hardens by cooling it or that hardens by evaporation or polymerizing of parts or all of the gel or liquid matrix. The process can be quickened by heating.

When the conducting medium 5 is comprised in a liquid or gel it may simplify deposition of the contacting medium to the light absorbing layer, the first porous conducting layer, the insulating portion and the first part of the conducting portion. The conducting medium is for example comprised in a liquid or gel. The liquid or gel is for example acetonitrile, CH3CN, ionic liquid, ionic gel, solvent with dissolved ions or a liquid that changes to gel depending on temperature. According to some aspects, the liquid or gel is dried after deposition such that ions of the conducting medium are dried into the layers and forming a conducting chain of conducting particles.

Above, some examples of dyes that can be used in the light absorbing layer have been discussed in the case that the solar cell is a dye-sensitized solar cell. There are many dyes that may be used and according to some aspects, the dye comprises triarylamine organic dye comprising any of, or a mixture of, dye in the class Donor-π bridge-Acceptor (D-π-A) and in the class Donor-Acceptor-π bridge-Acceptor (D-A-π-A). Such dyes give good efficiency of the solar cell, especially in combination with a copper based conducting medium.

Of the first-class photosensitizer are, for example, substituted (diphenylaminophenyl)-thiophene-2-cyanoacrylic acids or substituted (diphenylaminophenyl)cyclopenta-dithiophene-2-cyanoacrylic acids.

Of the second class are, for example, substituted ((((diphenylaminophenyl)benzothia-diazolyl)-cyclopentadithiophenyl)aryl/heteroaryl-2-cyanoacrylic acids or ((((diphenyl-aminophenyl)-cyclopentadithiophenyl) benzothiadiazolyl)aryl/heteroaryl-2-cyano-acrylic acids.

Examples of sensitizer, i.e. dyes, which may be used are:

XY1: (E)-3-(4-(6-(7-(4-(bis(2',4'-bis((2-ethylhexyl)oxy)-[1,1'-biphenyl]-4-yl)amino)phenyl)benzo[c][1,2,5]thiadiazol-4-yl)-4,4-bis(2-ethylhexyl)-4H-cyclopenta[2,1-b:3,4-b']dithiophen-2-yl)phenyl)-2-cyanoacrylic acid XY1b: (E)-3-(4-(6-(7-(4-(bis(2',4'-dibutoxy-[1,1'-biphenyl]-4-yl)amino)phenyl)benzo[c][1,2,5]thiadiazol-4-yl)-4,4-bis(2-ethylhexyl)-4H-cyclopenta[2,1-b:3,4-b']dithiophen-2-yl)phenyl)-2-cyanoacrylic acid Dyenamo blue: (E)-3-(5-(4-(4-(5-(4-(bis(2',4'-dibutoxy-[1,1'-biphenyl]-4-yl)amino)phenyl)thiophen-2-yl)-2,5-bis(2-ethylhexyl)-3,6-dioxo-2,3,5,6-tetrahydropyrrolo[3,4-c]pyrrol-1-yl)phenyl)furan-2-yl)-2-cyanoacrylic acid Dyenamo blue 2016: (E)-3-(5-(4-(4-(5-(4-(bis(2',4'-dibutoxy-[1,1'-biphenyl]-4-yl)amino)phenyl)thiophen-2-yl)-2,5-dioctyl-3,6-dioxo-2,3,5,6-tetrahydropyrrolo[3,4-c] pyrrol-1-yl)phenyl)furan-2-yl)-2-cyanoacrylic acid D35: (E)-3-(5-(4-(bis(2',4'-dibutoxy-[1,1'-biphenyl]-4-yl) amino)phenyl)thiophen-2-yl)-2-cyanoacrylic acid D45: (E)-3-(5-(4-(bis(2',4'-dimethoxy-[1,1'-biphenyl]-4-yl) amino)phenyl)thiophen-2-yl)-2-cyanoacrylic acid D35CPDT, LEG4: 3-{6-{4-[bis(2',4'-dibutyloxybiphenyl-4-yl)amino-]phenyl}-4,4-dihexyl-cyclopenta-[2,1-b:3,4-b'] dithiophene-2-yl}-2-cyanoacrylic acid D51: (E)-3-(6-(4-(bis(2',4'-dimethoxy-[1,1'-biphenyl]-4-yl) amino)phenyl)-4,4-dihexyl-4H-cyclopenta[2,1-b:3,4-b'] dithiophen-2-yl)-2-cyanoacrylic acid Y123: 3-{6-{4-[bis(2',4'-dihexyloxybiphenyl-4-yl)amino-] phenyl}-4,4-dihexyl-cyclopenta-[2,1-b:3,4-b']dithiphene-2-yl}-2-cyanoacrylic acid JF419: E)-3-(6-(4-(bis(5,7-bis(hexyloxy)-9,9-dimethyl-9H-fluoren-2-yl)amino)phenyl)-4,4-dihexyl-4H-cyclopenta [2,1-b:3,4-b']dithiophen-2-yl)-2-cyanoacrylic acid MKA253: (E)-3-(6-(4-(bis(5,7-dibutoxy-9,9-dimethyl-9H-fluoren-2-yl)amino)phenyl)-4,4-dihexyl-4H-cyclopenta [2,1-b:3,4-b']dithiophen-2-yl)-2-cyanoacrylic acid L0: 4-(diphenylamino)phenylcyanoacrylic acid L1: 5-[4-(diphenylamino)phenyl]thiophene-2-cyanoacrylic acid L2: 3-(5-(4-(diphenylamino)styryl)thiophen-2-yl)-2-cyanoacrylic acid In the following, an example of a method for manufacturing a first example of a solar cell according to the invention is described. A porous substrate 4 made of an insulating material is infiltrated with conducting and catalytic particles having a size smaller than the pore size of the substrate to form a conducting portion 4a of the porous substrate. A layer of insulating material is deposited on one side of the porous substrate to form an insulating portion 4b. The insulating material is, for example, microfibers made of a ceramic or organic material. An ink comprising conductive particles are deposited on the porous insulating portion to form the first porous conducting layer 2, and an ink comprising conductive particles are deposited on an opposite side of the porous substrate to form the second conducting layer 3. The insulating layer is, for example, deposited on the porous substrate by screen printing, slot die coating, spraying, or wet laying. The porous first and second conducting layers are, for example, deposited on the porous substrate by screen printing or any other suitable printing technique. A heat treatment may thereafter take place in order to sinter the first and second conducting layers. A porous semiconducting layer is printed onto the first porous conducting layer. Thereafter, the structure comprising the semiconducting layer, the conducting portion, the insulating portion and the first and second conducting layers is heat treated in order to sinter the porous semiconducting layer and, if previously not heat treated, also sintering of the first and second conducting layers may take place. The semiconducting layer may be infiltrated by an ink comprising a dye, thus forming the light-absorbing layer. An ink comprising the conducting medium is deposited so that the light-absorbing layer, the first porous conducting layer, the insulating layer and an upper part 4a' of the conducting portion is penetrated by the conducting medium. The lower part 4a" and the second conducting layer 3 are not penetrated by the conducting medium, thus economizing with the conducting medium.

In the following, an example of a method for manufacturing a solar cell according to the disclosure is described with reference to FIGS. 4 and 5. FIGS. 4 and 5 illustrates the deposition sequences in the manufacturing method.

Step 1: A blocking agent is deposited on a second side 42 of a substrate 4 made of an insulating material, to form a blocking layer 7 in an insulating portion 4b of the substrate 4. The blocking layer is deposited in order to physically prevent the conducting particles from being infiltrated all the way to other side of the substrate. Therefore, the blocking layer 7 prevents direct physical and electrical contact between the first porous conducting layer and the conducting particles. The blocking layer may consist of polymers, ceramic particles, polymer fibres, glass fibers, carbon nanotubes (CNT), nanocellulose or microfibrillated cellulose (MFC). It is advantageous to use fibers as a blocking agent in the blocking layer. It is advantageous to use fibres with very small diameter.

Step 2: The porous substrate 4 is infiltrated from a first side 41 of the substrate with conducting particles and catalytic particles or particles being both conductive and catalytic having a size smaller than the pore size of the substrate to form a conducting portion 4a in a first portion of the substrate.

Step 3: An ink comprising conductive particles is printed on the second side 42 of the porous substrate 4 to form the first porous conducting layer 2.

Step 4: An ink comprising conductive particles is printed on the first side 41 of the porous substrate 4 to form the second conducting layer 3.

Step 5: The structure is heat treated to burn off the blocking layer 10 thus forming the insulating portion 4b and the conducting portion 4a.

Step 6: A TiO2 electrode layer is deposited onto the first porous conducting layer 2 to form the working electrode, i.e. the light absorbing layer 1.

Step 7: The structure is heat treated to sinter the TiO2 electrode. The conducting layers 2, 3 may be sintered in the same heat treatment step or in an earlier step.

Step 8: The TiO2 electrode is infiltrated with a dye.

Step 9: A conducting medium is deposited so that the pores of the TiO2 layer, i.e. the light absorbing layer 1, the first porous conducting layer 2, the insulating portion 4b and the first part 4a' of the conducting portion are filled with conducting medium. The second part (4a") of the conducting portion is kept at a lower temperature, thus preventing the conducting medium to penetrate down to that part.

The invention is not limited to the above described example and can be varied within the scope of the claims. As an example, materials used for the different layers may vary depending on desired efficiency/cost ratio and on availability of different materials. Further, the method for manufacturing a solar cell can be carried out in many different ways within the scope of the claims. For example, there are many different kinds of chemical treatments that can be performed on the different layers of the solar cell but such treatments are not relevant to the described invention.

LIST OF REFERENCE NUMBERS

1: light absorbing layer
2: first porous conducting layer
3: second conducting layer
3': catalytic substance
4: porous substrate
41: first side
42: second side
4a: conducting portion
4a': first part of the conducting portion
4a": second part of the conducting portion
4b: insulating portion
5: conducting medium
6: conducting network
7: blocking layer

The invention claimed is:

1. A solar cell comprising:
a working electrode including a porous light absorbing layer,
a first porous conducting layer that extracts photo-generated electrons from the light absorbing layer, wherein the light absorbing layer is arranged on top of the first porous conducting layer,
a counter electrode including a second conducting layer,
a porous substrate made of a porous insulating material and disposed between the first porous conducting layer and the second conducting layer, wherein the porous substrate comprises:
a conducting portion comprising conducting particles in pores of the porous insulating material and forming a conductive network in the conducting portion that is in electrical contact with the second conducting layer, and
an insulating portion disposed between the first porous conducting layer and the conducting portion, and
a conducting medium that transports charges between the conducting portion and the light absorbing layer, wherein the conducting medium is located in the light absorbing layer, in the first porous conducting layer, and partly in the porous insulating material of the porous substrate, and
wherein the insulating portion of the porous substrate has the conducting medium therein,
wherein a first part of the conducting portion that abuts the insulating portion has the conducting medium therein, and
wherein a second part of the conducting portion that abuts the second conducting layer, and is between the first part of the conducting portion and the second conducting layer, is free of the conducting medium.

2. The solar cell according to claim 1, wherein the conducting medium is located in pores of the light absorbing layer, in pores of the first porous conducting layer, in pores of the insulating portion of the porous substrate and in pores of the first part of the conducting portion.

3. The solar cell according to claim 2, wherein the conducting portion comprises catalytic elements.

4. The solar cell according to claim 3, wherein the conducting portion comprises conducting and catalytic particles in the pores of the porous insulating material to form the conductive network in the insulating material and wherein the conducting medium is in electrical and catalytic contact with the conductive network in the first part of the conducting portion.

5. The solar cell according to claim 1, wherein a distance between the light absorbing layer and the first part of the conducting portion is between 0.2 µm and 60 µm.

6. The solar cell according to claim 1, wherein a thickness of the conducting portion is less than 1 mm.

7. The solar cell according to claim 1, wherein a thickness of the insulating portion is between 0.1 µm and 40 µm.

8. The solar cell according to claim 1, wherein a thickness of the first porous conducting layer is between 0.1 µm and 40 µm.

9. The solar cell according to claim 1, wherein a thickness of the first part of the conducting portion is smaller than a thickness of the second part of the conducting portion.

10. The solar cell according to claim 1, wherein a thickness of the porous substrate is between 10 µm and 1 mm.

11. The solar cell according to claim 1, wherein the insulating portion is an integral part of the porous substrate.

12. The solar cell according to claim 1, wherein the conducting medium comprises copper ions.

13. The solar cell according to claim 1, wherein an average pore size of the porous substrate is larger than an average pore size of the first porous conducting layer, and wherein the average pore size of the first porous conducing layer is larger than an average pore size of the light absorbing layer.

14. The solar cell according to claim 4, wherein the conducting and catalytic particles comprise one or more of: PEDOT, carbon, platinum, titanium, titanium alloys, nickel, nickel alloys, carbon based materials, conducting oxides, conducting nitrides, conducting carbides, conducting silicides, platinized FTO, ATO, ITO, graphene and carbon nanotube particles.

* * * * *